United States Patent [19]

French

[11] 4,209,052
[45] Jun. 24, 1980

[54] WHEEL FLANGE RETAINING RING

[75] Inventor: Robert J. French, Wadsworth, Ohio

[73] Assignee: Goodyear Aerospace Corporation, Akron, Ohio

[21] Appl. No.: 953,505

[22] Filed: Oct. 23, 1978

[51] Int. Cl.² .............................................. B60B 25/18
[52] U.S. Cl. ................................ 152/410; 301/35 SL
[58] Field of Search .............................. 152/405–410; 301/35 SS, 35 SL; 24/201 R; 403/313, 309

[56] References Cited

U.S. PATENT DOCUMENTS

| | | | |
|---|---|---|---|
| 834,504 | 10/1906 | Banker | 152/408 X |
| 894,293 | 7/1908 | Shaw | 152/406 |
| 959,236 | 5/1910 | Let | 152/407 |
| 1,409,005 | 3/1922 | Jobski | 152/408 |
| 2,178,502 | 10/1939 | Stone | 152/407 |
| 2,651,348 | 9/1953 | Monette | 152/410 |
| 3,608,607 | 9/1971 | Gerbeth | 152/410 |

FOREIGN PATENT DOCUMENTS

| | | | |
|---|---|---|---|
| 642764 | 3/1928 | France | 152/410 |
| 415006 | 9/1946 | Italy | 152/410 |

Primary Examiner—Charles A. Marmor
Attorney, Agent, or Firm—P. E. Milliken; E. W. Oldham; R. L. Weber

[57] ABSTRACT

A wheel flange retaining ring provided about the circumference of an aircraft wheel to maintain a removable flange thereabout. The invention includes a metallic band having a bulb received within a circumferential groove formed within the wheel frame. The band makes contacting engagement with a surface machined into the flange. The band is caused to form a completed ring maintained within the circumferential groove by a clip having a bent-tab section which makes secured engagement with tongues provided at each end of the band.

6 Claims, 2 Drawing Figures

WHEEL FLANGE RETAINING RING

BACKGROUND OF THE INVENTION

The instant invention resides in the art of wheel assemblies and most particularly those assemblies provided for aircraft. Heretofore in the art, it has been known to produce aircraft wheels wherein a wheel flange, having a rim formed thereon, is adapted for placement upon the wheel frame after the tire is mounted. This flange is then secured by means of a band received within the wheel frame and making contacting engagement with the flange. In such prior art assemblies, the flange is forced into secure contacting engagement with the band by means of the force imparted at the bead formed between the tire and the rim upon the flange. In instances where the tire has been blown or is otherwise flat, this forceful engagement is absent and, due to an inward yaw force on the tire, the flange may slide inwardly upon the wheel web, allowing the retaining band to escape from the wheel frame when sprung open due to centrifugal force. When this occurs, the revolving wheel will throw the retaining band out, thereby allowing the flange and tire to move outwardly and off the wheel if the yaw force is released or reversed. As is well known in the art, this situation is a dangerous one, whether encountered upon take-off or landing of the aircraft.

OBJECTS OF THE INVENTION

In light of the foregoing, it is an object of the instant invention to provide a wheel flange retaining ring which is continuous in nature.

Another object of the invention is to provide a wheel flange retaining ring which, without force imparted to the wheel flange, is securedly engaged with the wheel frame.

Yet a further object of the invention is to provide a wheel flange retaining ring which is secured to the wheel frame by means of a clip interengaging opposite ends of a band used to form the ring.

Still another object of the invention is to provide a wheel flange retaining ring which is simple and inexpensive to construct while being readily conducive to implementation with state-of-the-art wheel assemblies.

SUMMARY OF THE INVENTION

The foregoing and other objects of the invention which will become apparent as the detailed description proceeds are achieved by an improvement in an aircraft wheel assembly comprising a wheel frame; a flange maintained about said frame; and a continuous ring assembly received by said frame and interpositioned between said flange and frame.

DESCRIPTION OF DRAWING

For a complete understanding of the objects and structure of the invention, reference should be had to the following detailed description and accompanying drawing wherein.

DETAILED DESCRIPTION OF PREFERRED EMBODIMENT

Figure 1:
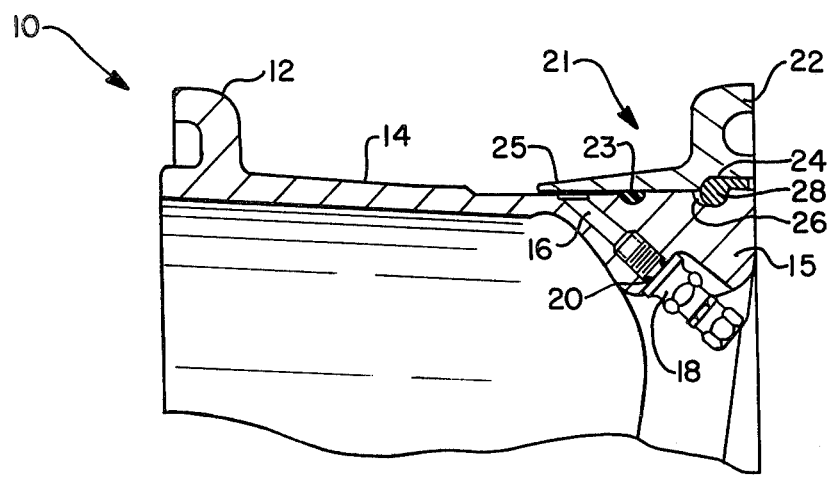
FIG. 1 is a partial sectional view of a wheel assembly utilizing the teachings of the invention.

Referring now to the drawing, and more particularly FIG. 1, it can be seen that a single-web wheel is designated generally by the numeral 10. It will be understood that the instant invention is readily adapted for implementation with any of numerous wheel assemblies, including those made from wheel halves or the like. In any event, the wheel 10 includes a rim 12 about one circumferential edge thereof, and upon which a tire (not shown) may form a bead in standard fashion. Extending from the rim 12 is a metallic section comprising the web 14 which extends to the major portion of the wheel frame 15. In standard fashion, an air passageway 16 is provided in communication with the envelope defined by the tire for inflating said envelope under control of the valve 18. This valve is sealingly engaged as by threading into the wheel frame 15, causing compressive engagement with the O-ring or other suitable seal 20.

When a tire is mounted upon the wheel 10 in bead-forming engagement with the rim 12, the removable flange 21, being circular in nature, may be slid upon the wheel frame 15 to provide a second bead with the tire by means of the rim 22. At this point in time, an envelope is defined by the tire between the rims 12,22 and the web 14. The tire is inflated by pressurization of the envelope via the passageway 16 and valve 18. An air seal 23, maintained within the wheel frame 15, facilitates such inflation by sealing engagement with the leg 25 of the removable flange 21.

Figure 2:
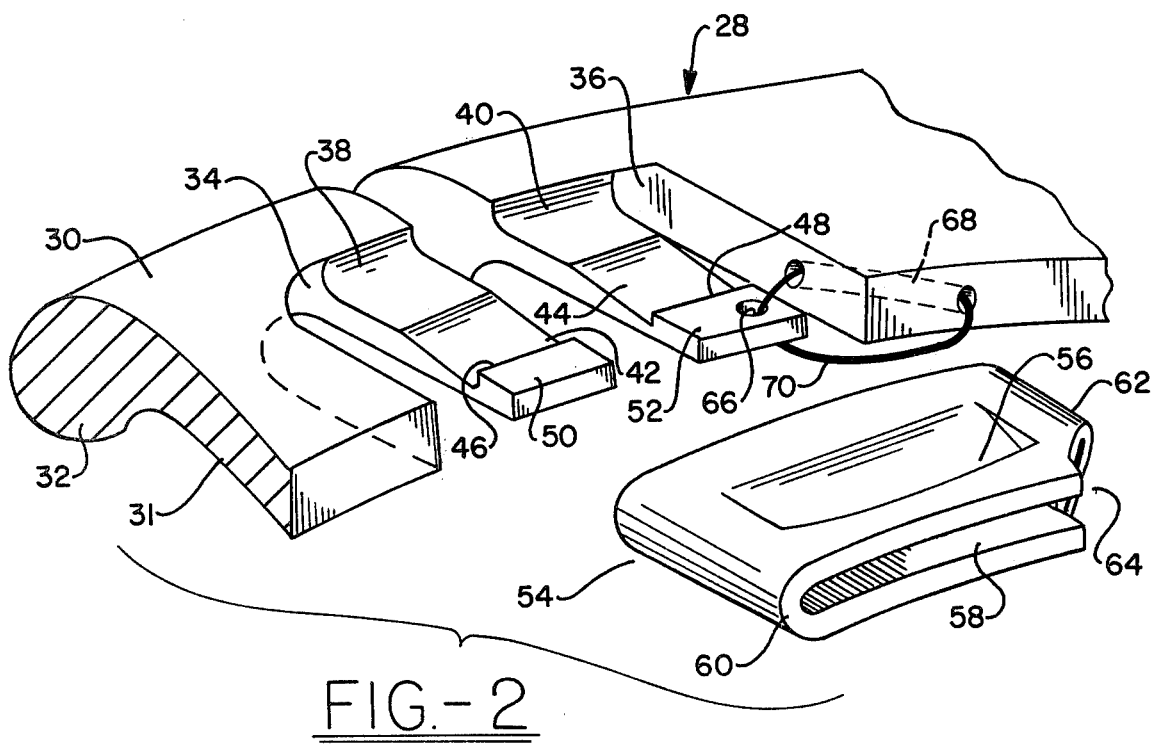
FIG. 2 is a partial plan view of the clip of the invention interconnecting ends of a band to form the continuous ring maintained about the wheel frame.

A groove 24 is housed out of the bottom outer edge portion of the flange 21 and opposite the circumferential groove 26 maintained about the wheel frame 15. A band 28, shown in FIG. 2, is received between the grooves 24,26 to restrain movement of the flange 21. This band, constructed of aluminum or other corrosion-resistant material, is characterized by a flat top surface 30, riding in the machined groove 24, and a bulb 32 received in the circumferential groove 26. The ends of the band 28 are slotted as at 34,36 to define respective tongues 38,40. These tongues are machined from the top surface 30 and the bottom surface 31 to be of a reduced thickness and are machined on an incline as at 42,44 to form the lips 46,48. Finally, flat end blocks 50,52 characterize the ends of the tongues 38,40, respectively.

An elliptical or rectangular clip 54 is provided for securing the ends of the band 28 to form a continuous ring. Clip 54 is characterized by a bent-tab section 56 centrally positioned therein and formed by cutting three sides of a rectangle into the top surface thereof. The tab 56 is bent downwardly into the opening 58 which is bonded on either side by the ends 60,62. These ends are respectively adapted for being slid into the slots 34,36. Such sliding activity causes the tab 56 to ride upon the top surfaces of the end blocks 50,52 and then snap down over the lips 46,48 to make securing engagement therewith. To achieve this type of operation, the clip 54 is preferably constructed of spring steel or, for corrosion-resistant purposes, of stainless steel. In either event, the tab 56 has a spring-type characteristic associated therewith for achieving the desired secure engagement.

It will be seen that the front corner of the end 62 is notched as at 64. This notch exposes the hole 66 passing through the end block 52. A passage 68 is drilled through the band 28 from a front edge thereof to the slot 36. When the clip 54 is in engagement with the lips 46,48 of the tongues 38,40, a safety lock wire 70 may then be passed through the passage 68 and the hole 66 and the ends thereof secured together to further prevent the possibility of the clip 54 becoming disengaged from the ends of the band 28. Such utilization of the lock wire 70 is for purposes of increasing the safety factor of the assembly as a whole, it being understood that the clip 54, having a spring tab 56, is, itself, capable of making substantial secured engagement with the band 28. The notch 64 facilitates proper connection of the clip 54 to the band 28. Only when the notch exposes the hole 66 is the clip 54 properly positioned such that the tab 56 engages the lips 46,48. Hence, securing of the lock wire 70 indirectly assures that the clip itself is properly inserted.

In use, a tire is mounted upon the wheel frame 15, making contacting engagement with the rim 12. The removable flange 21 is then slid onto the wheel frame and inwardly toward the rim 12 so as to expose the circumferential groove 26. The band 28 is then wrapped about the wheel frame 15 with the bulb 32 being received in the groove 26. When the band is wrapped completely about the wheel frame 15, the ends of the band are in close proximity to each other and the clip 54 may be secured in the manner discussed above. It will be noted that the tongues 38,40 are machined to be of a lesser thickness than the remainder of the band 28, such that the clip 54 makes a relatively smooth continuous surface for the ring assembly. With the ring assembly in place, the wheel flange 21 is allowed to slide outwardly on the wheel such that the groove 24 makes contacting engagement with the front edge of the bulb 32 and the top surface 30 of the band 28. The ring assembly 28,54 then secures the wheel flange 21 to the wheel frame 15 and in bead-making engagement with the tire. At this time, the tire may be inflated via the valve 18 and the entire wheel assembly is completed. The band is then fixedly retained within the groove 26 until removal of the safety wire 70 and clip 54 may be made by a mechanic.

Thus, it can be seen that the objects of the invention have been achieved by the structure presented hereinabove. While in accordance with the patent statutes only the best mode and preferred embodiment of the invention has been presented and described in detail, it is to be understood that the invention is not limited thereto or thereby. Consequently, for an appreciation of the true scope and breadth of the invention, reference should be had to the following claims.

What is claimed is:

1. An improvement in an aircraft wheel assembly, comprising:
    a wheel frame having a circumferential groove passing thereabout;
    a flange maintained about said frame; and
    a continuous ring assembly received by said frame and interpositioned between said flange and frame, said ring assembly including a band having a bulb received within said circumferential groove and first and second ends held together by a clip, said band having a tongue at each said end and including slots therein in juxtaposition to said tongues, said clip being received within said slots and having a bent-tab section in secured engagement with said tongues.

2. The improvement in an aircraft wheel assembly according to claim 1 which further includes a wire passing across one of said slots between one of said tongues and said band.

3. A wheel flange retainer comprising:
    a band having an enlarged bulb depending therefrom for making engagement with the frame of a wheel, said band having two ends;
    a clip including a spring biased bent-tab; and
    a tongue formed at each end of said band, each said tongue having a lip thereon for making securing engagement with said spring biased bent-tab for securing said ends in fixed relationship to each other.

4. The wheel flange retainer as recited in claim 3 wherein a slot separates each tongue from the remainder of said band, said clip being received within said slots.

5. The wheel flange retainer as recited in claim 3 wherein said clip includes an opening receiving said tongues, said bent tab depending into said opening.

6. The wheel flange retainer as recited in claim 5 wherein said tongues are of a thickness less than that of the band and wherein said clip, received upon said tongues, provides a continuous surface upon said band and across said clip to form a substantially homogeneous ring.

* * * * *